United States Patent
Wolff

[11] 3,807,183
[45] Apr. 30, 1974

[54] UNDERGROUND CULVERTS FOR PIPELINES AND METHOD FOR MAKING SAME

[76] Inventor: Ingemar Filip Paulus Wolff, Hermdallsvagen 5, Sodertelje, Sweden

[22] Filed: Feb. 9, 1971

[21] Appl. No.: 113,826

Related U.S. Application Data

[63] Continuation-in-part of Ser. No. 806,133, March 11, 1969, abandoned.

[52] U.S. Cl............................ 61/72.1, 61/43, 61/45, 138/105, 138/149
[51] Int. Cl............................................... F16l 1/00
[58] Field of Search ............ 61/16, 72.1, 72.6, 72.7, 61/72.2, 43, 45; 138/105, 106, 149, DIG. 4

[56] References Cited
UNITED STATES PATENTS

| | | | |
|---|---|---|---|
| 1,904,001 | 4/1933 | Kimmel............................ | 61/13 X |
| 2,862,367 | 12/1958 | Silverstein et al. ................ | 61/16 X |
| 2,663,323 | 12/1953 | Thomas ............................ | 138/105 |
| 384,948 | 6/1888 | Young............................... | 138/105 |
| 2,857,648 | 10/1958 | March............................... | 138/105 |
| 3,355,572 | 11/1967 | Chrow .............................. | 165/136 X |
| 3,563,503 | 2/1971 | Lancaster ....................... | 138/106 X |

FOREIGN PATENTS OR APPLICATIONS

664,824   6/1963   Canada............................ 138/105

Primary Examiner—Jacob Shapiro
Attorney, Agent, or Firm—Holman & Stern

[57] ABSTRACT

An insulating and protective underground culvert for one or more pipelines carrying heating fluid at elevated temperatures adapted to be laid in a trench and covered with the material removed from the trench in the usual manner. The pipelines are of a non-corroding material such as stainless steel or a suitable plastic material, and are also substantially non-insulated. The pipelines are positioned on a base member of heat insulating material which is also previous to water, for instance, ROCKWOOL at the bottom of the trench.

The pipelines and the base member are then covered by a vault-shaped member, of a heat insulating material, but which is impervious to water. An air-space is provided between the inner surface of the cover and the pipeline or pipelines, for preventing direct heat conduction to the cover. The combination of a heat insulating base member pervious to water, substantially non-insulated pipelines in direct heat transfer contact with the base member, a vault-shaped cover of a heat insulating but impervious to water material straddling the base member and the pipelines, and out of direct heat transfer contact with the pipelines, provides for a self-drying culvert possessing excellent heat insulating properties.

The culvert will be efficient also at high ground moisture content, and will even tolerate comparatively large quantities of water occasionally but it may not be laid below the ground water level. In practice, this is no serious limitation, and the present culvert may generally be used in place of an hermetically sealed culvert of heavier and much more expensive design, used up to the present time for insulating and protective purposes.

5 Claims, 5 Drawing Figures

UNDERGROUND CULVERTS FOR PIPELINES AND METHOD FOR MAKING SAME

CROSS REFERENCE TO A RELATED APPLICATION

This application is a continuation-in-part of my co-pending application Ser. No. 806,133 filed on Mar. 11, 1969 and now abandoned.

BACKGROUND OF THE INVENTION

As is known in the art, underground pipelines may be used to carry a heating fluid at elevated temperatures from one location, such as a power station, to another, such as a residential area. It is, in many cases, much more economic to supply heat in this manner than to provide a separate furnace or similar heating plant for each house.

In order to realize these economical advantages, it is necessary that the costs for material and labor for the pipelines and an insulating and protective culvert therefore do not become too high, and that the maintenance costs and the heat losses are also kept within predetermined limits.

PRIOR ART

The practice up to the present has been to use a more or less hermetically sealed culvert for the pipelines. The reason for such an arrangement has been the requirement to have a watertight culvert to prevent the heat losses from reaching unacceptably high values if the culvert is flooded with water for one reason or another. If water enters the culvert, it will establish a heavy heat transfer between the pipeline and the environment. Sealed culverts of this type are well known in the art, and have one major draw-back in common, namely, the high cost of material as well as that of labor.

Another draw-back of essential importance is the fact, that in reality, there is no way by which water can always be prevented from penetrating into the culvert. Thus, seismic movements might crack or otherwise break the culvert; the culvert might be flooded through an inspection well at heavy rainfall, or one of the pipelines might break and release water inside the culvert. For all practical purposes, a watertight culvert design offers no guarantee that water might not eventually reach the interior thereof. If this happens, and even if only a small amount of water is involved compared with the total volume of the interior of the culvert, an evaporation/condensation process will take place and will be maintained indefinitely by the fact that the culvert is essentially watertight. Thus, water will evaporate from the hot surfaces of the pipelines, and condense on the cooler inner surface of the culvert, from which area the transported heat will be dissipated to the environment. In this way, the heat losses of the culvert increase heavily, and the losses will not be confined merely to the place where water initially entered the culvert, but will be gradually extended to the entire culvert by the evaporation/condensation process until a steam pressure equilibrium has been reached.

The only way to treat this situation is to dry the entire culvert, for example, by blowing hot, dry air through the interior thereof. This is a time-consuming and expensive process, which may not always be successful with reasonable efforts. If, for example, the pipelines are insulated with a porous, water-absorbing material, it might virtually be impossible to dry the culvert in this fashion. If large amounts of water are involved, it might even be necessary to dig up the entire culvert and break the culvert open. The expenses for this procedure, and the subsequent re-sealing of the culvert, might very well be the same as the costs of a new culvert, not including the probable discomfort and economical loss caused by the shutting down of the heat supply through the culvert, or operating the culvert with heavy heat losses.

If the drenching of the culvert's interior was due to a break in the watertight cover thereof, it is also very difficult, if not impossible, to determine exactly where the break is located, since the moisture gradually may spread throughout the entire culvert. In some cases, it has proved necessary to remove and inspect the culvert to locate the break. Incidentally it is, of course, necessary to locate and repair a break, since the heat losses otherwise will become permanent.

In order to eliminate the risk for a break of the culvert cover, attempts have been made to make the cover as strong as possible, so that no breakage would occur unless the strains were extreme. This is a very expensive way to solve this problem, and also requires a very careful sealing between the culvert sections.

It is also known in the art to provide vault-like covers for underground electrical cables or the like, the covers serving to protect the cables from ground loads, with the cables per se being provided with the insulation to prevent water penetration. A similar design has also been proposed for underground culverts for pipelines carrying heating fluids at elevated temperatures. The proposal has been to make the cover as well as the base member of a material impervious to water, and to provide seals between the cover and the base member and between the different sections of the culvert, to result in a watertight assembly. These and similar previous attempts to solve the problem have, however, proved neither economical nor efficient.

At the time when the present invention was conceived, the state of the art more and more inclined towards the provision of heavy-duty culvert designs, which are rather expensive, and only moderately reliable. Expensive mistakes have proved this to be a blind alley, and the need for an inexpensive and reliable culvert led to the present invention.

OBJECT OF THE INVENTION

It is an object of the invention to provide an improved insulating and protective culvert design for one or more underground pipelines carrying a heating fluid at elevated temperatures.

It is also an object of the invention to provide such a culvert design which is self-drying, and which may be manufactured from inexpensive material.

A further object of the invention is to provide a culvert design which utilizes in the best possible manner, the features of non-corroding material in pipeline design.

It is a further object of the invention to provide an improved culvert of the above-mentioned type having low heat losses as well as an inexpensive, labor-saving design.

These and other objects of the invention, as well as the scope, nature and utilization of the invention will be apparent from the following detailed description, drawings and appended claims.

SUMMARY OF THE INVENTION

It has been found that all the disadvantages of prior culverts as set forth in the preceding summary of the may be overcome if the design is carried out from the following technical and economical considerations:

1. The cost for material should mainly be expended on the pipelines per se, i.e. one should use the best material to have strong and reliable pipelines. The outer cover or culvert should only have insulating and protective properties determined by acceptable heat losses and the mechanical load over the culvert site.

These considerations are met by using non-corroding material for the pipelines and non-expensive plastic or similar material in the culvert surrounding the pipelines.

2. Heat losses from the pipelines are unavoidable. The heat losses should be put to use, and the best possible use would be to have a self-drying culvert design, with the drying action caused by the dissipated heat.

3. In the dry condition, the cover for the present culvert should have at least as good thermal insulation properties as the insulation of a conventional culvert. If, on the other hand, water penetrates into the culvert, the self-drying action should take place immediately, to avoid long-time losses. It was realized that this could only be obtained in a non-seal culvert, in which the moisture was able to penetrate into the culvert and initiate itself the self-drying by drastically lowering the insulation properties locally, and thus effect a quick self-drying. Hence, different materials have to be selected for different parts of the culvert, and the pipelines should have different heat conduction to the different materials. The culvert according to the invention essentially derives its properties from the following arrangements, as will be described more in detail in connection with the drawings:

Non-insulated, or substantially non-insulated tubes of a non-corroding material, such as stainless steel or a suitable plastic material are used for pipelines. The pipelines are placed directly on and in heat transfer contact with a base member of a porous, insulating material, pervious to water. The base member is placed at the bottom of a trench, with the lower side of the base member being directly exposed to the environment. Under the base member, the trench may be drained in a conventional manner in order to take care of large quantities of water. Above the base member and the pipelines is placed a vault-shaped cover of a heat insulating material, impervious to water. The cover straddles the pipelines and the base member and thus is able to deflect water from above, such as rain water during or after a heavy rainfall or a local flooding, from reaching the pipelines. Further, an air-space is left between the pipelines and the inside of the cover, so as to avoid direct heat transfer. Thus, when the culvert and its surrounding are dry, the heat transmission will be mainly downwardly through the base member. If the latter becomes moist due to any water from the surroundings or from the culvert per se, its heat transmission characteristics will change drastically and large amounts of heat will be conducted to the moist material, thereby initiating rapid self-drying before the moisture may spread throughout the culvert. In this way, the overall heat losses are kept to a minimum and, what is more, effectively used to drive out the water, and form around the culvert what might be called a heat shield, as will be further described.

DETAILED DESCRIPTION OF THE INVENTION

Figures 1A, 1B:
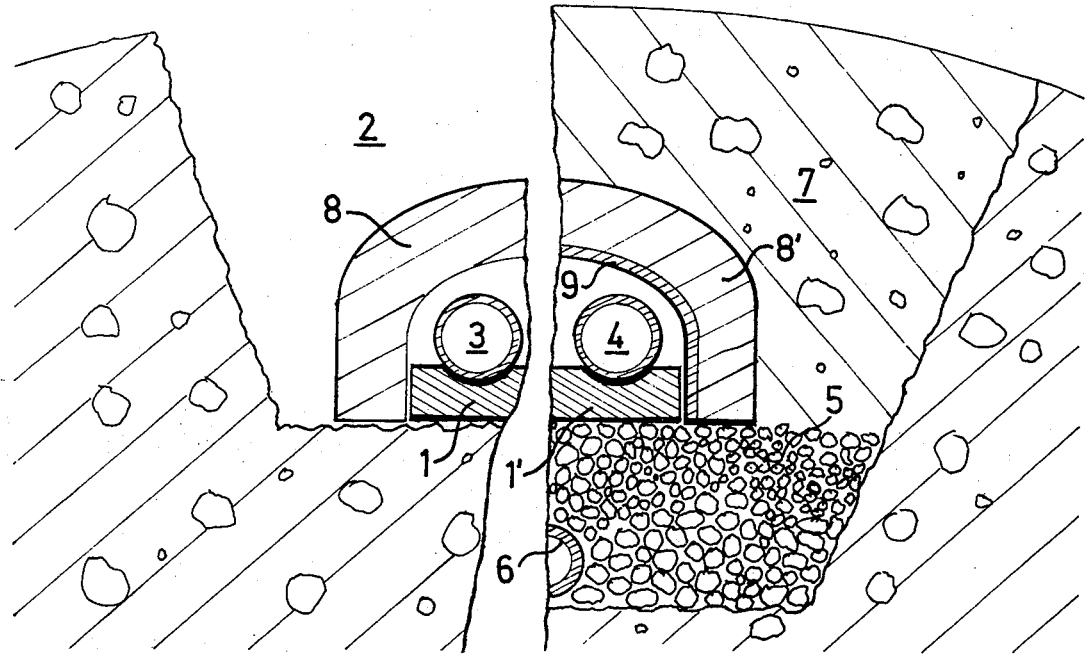
FIG. 1a is a cross-section through a culvert according to the invention illustrating a first embodiment of the invention.
FIG. 1b is a similar view of a second embodiment.

In the drawings the same reference numerals have been used throughout for similar parts, but the parts, of course, are not identical in the different embodiments. In FIG. 1a there is shown a base member 1 situated directly on the bottom of a trench 2. The base member 1 may be of one or more layers of a porous, heat insulating material which is pervious to water, such as ROCKWOOL or similar material. Of course, many different materials meet the requirements of being good heat insulators when dry, and also being pervious or absorbent to water. In a preferred embodiment, however, 5 to 10 centimeters of a ROCKWOOL mat has proven excellent for this purpose. Other fiber material of a similar kind would probably be equally suitable, and granular material might be used as well, provided steps are taken to ensure a proper distance between the pipelines and the bottom of the trench. Such matters involve nothing more than a choice of material which should be obvious to anyone skilled in the art once acquainted with the principles forming the basis of the present invention.

The pipelines 3 and 4 are of stainless steel or some similar non-corroding material, and placed directly on top of the base member 1 in good thermal contact therewith. The pipelines should be essentially non-insulated for two reasons. The first is, that a good heat transfer contact between the pipelines and the base member 1 is necessary to obtain the self-drying action in a proper and efficient way. This, of course, does not exclude the use of pipelines being surface coated or given some similar treatment, but they may not be provided with thick, heat insulating covers, and this is the meaning of the expression substantially non-insulated as used in the specification and the claims.

A second reason for avoiding insulated pipelines is, that any moisture trapped between such an insulation and the stainless steel tube might sooner or later cause serious crevice corrosion. Therefore, completely non-insulated stainless steel tubes are preferred for the pipelines, but this may also be merely a matter of choice, particularly as new and improved plastic materials more and more become available for use in systems of this character. Thus, the pipelines also could be of plastic material, either multilayer material or a fiber-reinforced material which is noncorroding as well as having a comparatively large thermal conductivity.

An outer cover 8 of a generally vault-like shape is provided as an insulation or protection for the pipelines 3 and 4 as well as for the base member 1. The cover 8 should be heat insulating and impervious to water, and foamed polyurethane has proved excellent for this purpose. In a preferred embodiment, the cover may have a thickness of about 10 centimeters. It is important that the cover have a large enough inner cross-section so as not to come into direct contact with the pipelines 3 and 4, which would lower the insulation properties of the culvert, and also possibly provide a source for crevice corrosion. In addition, the cover material might be damaged, since in some instances, the pipelines might be used for very hot or even superheated water.

The embodiment thus described and shown in FIG. 1a constitutes the basic elements of the present culvert, apart from the fact that the culvert must be covered with earth up to ground level, as illustrated in the right-hand side of the figure.

FIG. 1b shows an arrangement similar to that of FIG. 1a covered by a back-filling 7. The cover 8' is further provided with an inner cover or lining 9 of asbestos cement or other suitable material, which is mechanically rigid and heat resistant. This extra cover 9 acts as a stiffening member and also prevents damage to the cover 8' from the hot tubes. The extra cover 9 is per se impervious to water and thus the cover 8 might be more or less pervious to water without seriously lowering the insulation properties of the culvert, provided the material holds water by capillary action, so as to limit the heat transfer. It is, however, preferable for the cover 8' to be of polyurethane foam material or a similar material, as is the case of the cover member 8.

In addition, the culvert 1 is placed on a drained portion at the bottom of the trench 2. Under a bed 5 of gravel and/or stones, a drain pipe 6 is arranged, such as a conventional clay pipe. This arrangement takes care of any large amounts of water which might result from, e.g., heavy rainfall, melting snow or ice, or flooding. Thus, even if the culvert becomes partly or wholly filled with water, most of the water will disappear rather rapidly through the drain system, and the selfdrying action of the culvert needs only to take care of remaining moisture, and then gradually re-establish dried out conditions around the culvert.

Figure 2:
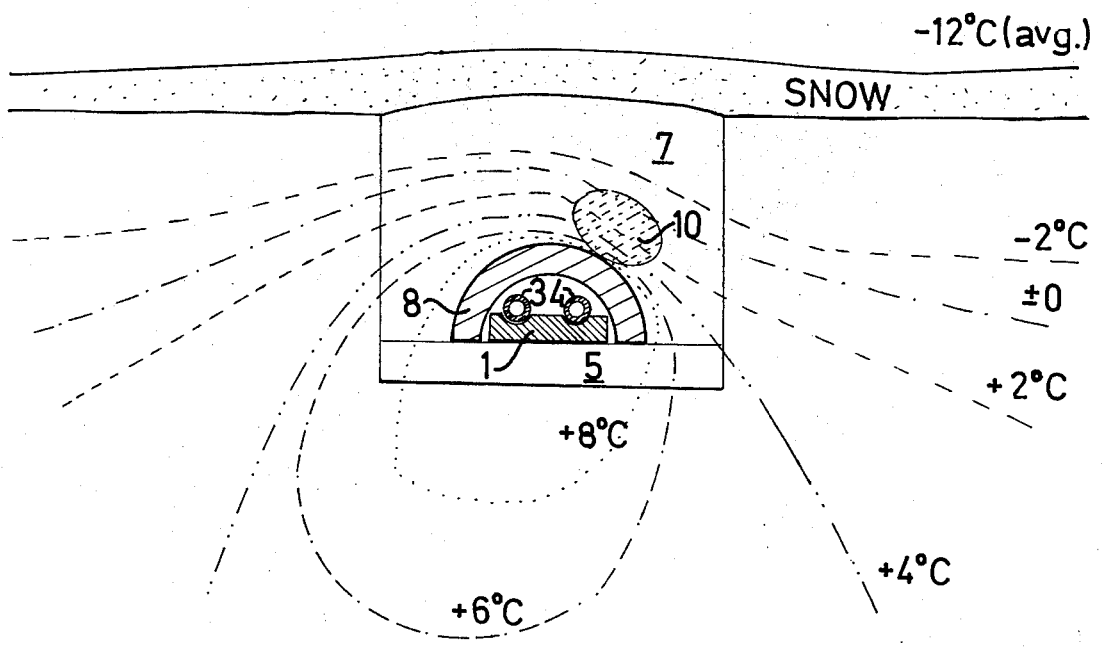
FIG. 2 shows in a somewhat smaller scale than FIGS. 1a and 1b, a cross-section through a third embodiment of a culvert, and the typical isothermal lines for winter conditions in a cold climate around the culvert.

FIG. 2 illustrates a representative heat distribution around a culvert according to the invention. The pipelines 3 and 4 were situated at a depth below the ground surface of approximately 70 centimeters. The measurements were carried out during the month of December and the average temperature was −12 degrees centigrade at the test location. The ground was covered by approximately 10 centimeters of snow. It is interesting to note the buckling of the isothermal lines in region 10, which was most probably caused by a local excess of moisture. The moisture increases the heat conductivity of the ground, thereby resulting in a steeper temperature gradient towards the cover 8. The buckling of the isothermal lines for +8 and +6 degrees centigrade towards the left seems to indicate that some water might be flowing downwardly into the earth on the right-hand side of the culvert. The isothermal lines are essentially similar to the pattern obtained for a sealed culvert, and the thermal insulation of the present culvert is definitely as good as the thermal insulation obtained under the same conditions by a considerably more expensive culvert.

In the culvert of FIGS. 1a, 1b or 2, the self-drying proceeds as follows:

Any water which enters the culvert will ultimately reach the base member 1 or flow downwardly into the gravel or stone bed 5 through the space between the edges of the base member and the lower inner surface of the cover 8. If large quantities enter, most of the water will flow out the latter way, which is one of the important features of a non-sealed culvert according to the invention. Since the hot, non-insulated pipelines 3 and 4 are in direct contact with the base member 1, there will be a region of contact therebetween having essentially the same temperature as the heating fluid, i.e. in the order of at least say 80° centigrade, possibly 100° or even higher. This will result in water evaporating from the hot surface, and part of the evaporate will recondense in the material of the base member 1 farther away from the pipelines. Due to the continuous supply of heat, the region of condensation will be moved farther and farther away, and thereby progressively drying out the base member. This will take place in a region of a steep temperature gradient, and the drying will be very efficient.

Another portion of the evaporate will condense on the inner surface of the cover member 8 or 9 respectively, and the condensate will travel downwardly under the influence of gravity until it flows down into the space between the base member 1 and the lower shanks of the cover 8, and is absorbed in the gravel bed 5, the earth or by the base member. It should be noted, that it is unlikely that water vapor will travel very far in the longitudinal direction of the culvert, since the temperature of the inner surface of the cover 8 will be lowered at the location where the condensation process first occurs, i.e., in the immediate vicinity of where the evaporation starts. Thus, the evaporation/condensation process is confined to the immediate vicinity of the leak or similar reason for water entering the culvert, and due to the good thermal conductivity of the non-insulated pipelines, the drying takes place very rapidly at normal conditions.

The above description applies to a case in which a leak has occurred. The normal, steady state behavior of the present culvert is illustrated in FIG. 2, and it will be realized that, say from the +8 isothermal line and inwardly, the temperature gradient will be very steep if the ground is sufficiently dry, and this will, so to speak, result in a heat shield surrounding the culvert, preventing minor amounts of water from penetrating towards the culvert. The culvert is thus kept in an ideal dry condition, and the interior of the culvert including the inner surface of the cover member 8 and 9 respectively as well as the portions of the base member 1 which is in thermal contact with the pipelines, will be kept at a temperature only slightly lower than the temperature of the heating fluid in the pipelines 3 and 4.

The temperature gradient in the cover is also comparatively high, and this does not change at high moisture content, since the cover 8 is impervious to water. Hence, the heat transfer rate through the cover remains comparatively low even at a high moisture content in the ground. This is no disadvantage, as far as the self-drying action is concerned, since it is of little consequence if the ground above and on either side of the culvert is moist. It is, however, neither economical nor of any technical advantage to use an excessively thick insulation for the cover 8, since obviously the costs increase with increasing thickness, and also because a certain heat radiation is desirable, since it will eventually create a dry zone surrounding the top and sides of the culvert as well, thereby ultimately improving the total heat insulation and preventing to a certain extent, water from reaching the culvert.

In order to establish the desired heat shield symmetrically around the culvert, the pipeline or pipelines, as the case may be, should be located to provide a symmetrical heat dissipation. If the culvert is for one pipeline only, this should obviously be located centrally in the culvert. Two pipelines of substantially the same heat dissipation capacity should be located symmetrically with respect to a longitudinal symmetry plane through the center of the culvert. In the event, which is rather common, that one pipe is used as a supply line and the other pipe as a return line, and if the heating fluid temperature differs considerably between the two pipes, the colder of the pipes may have a larger diameter and/or located closer to the inside of the cover than the hotter pipe to establish a substantially symmetrical temperature distribution field around the culvert. Practical considerations will determine if such is necessary for any particular application, and the actual manner in which such symmetry may be obtained will be obvious to anyone skilled in the art, and is no part of the present invention.

It is apparent that the present culvert may include other conduits as well, such as cold water conduits, electrical cables or the like. Such conduits are not shown in the drawings, since they would have little or no influence on the effect of the culvert, provided obvious design precautions are taken.

The method of building a culvert according to the invention is very simple, and is but briefly described with reference to FIG. 3 and FIG. 4. The trench is dug to a suitable depth, with the minimal depth being essentially determined by the zero centigrade winter isothermal surface at the building site, and the corresponding acceptable heat losses, taking into account the type and normal moisture content of the ground. The maximum depth is limited by the ground water level, since the present culvert under no circumstances may be placed at such an extreme depth that it might be flooded by artesian water. For all practical purposes, these considerations will lead to a depth of say 50 to 100 centimeters as being the most practical.

Figure 3:
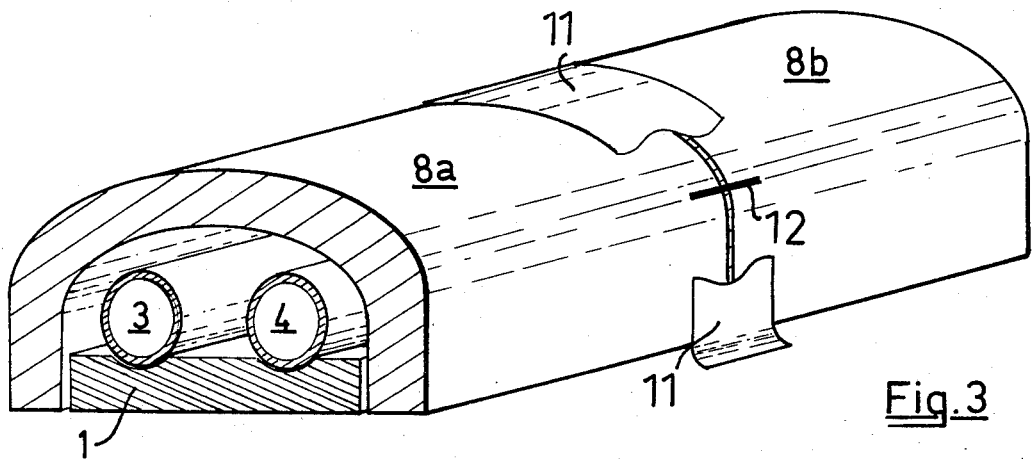
FIG. 3 is a perspective view partly in crosssection of two successive sections of a culvert, essentially of the kind illustrated in FIGS. 1a and 1b.

In FIG. 3, two sections 8a and 8b of the insulating and protective cover are shown joined in end to end relationship. The culvert is preferably built of comparatively short sections which are light enough not to require any hoisting machinery for their handling at the building site. Since polyurethane foam material has a very low bulk density, the sections may be of considerable length and yet be handled quite easily by two workmen. Any suitable joint between the sections may be used, and it would not be disadvantageous if the joints between the sections 8a and 8b were sealed by a filler of some type. In the present culvert, such a seal would, however, not have any particular major advantages and hence a simple butt-joint is preferred. The covers may be kept together, i.e., prevented from being displaced with respect to one another during the filling of the trench by means of suitable staple-like cramp-irons 12, the legs of which are pressed into the material of the cover. Alternatively, metal wire may be used to sew together the sections at the joints.

To prevent dirt and water from entering the culvert through the more or less wide space between the sections at the joint, the joint may be covered by a strip 11 of sheet material, such as a plastic foil. The trench 2 is then filled with earth 7 previously removed when forming the trench, or the trench may be filled with some other material, if suitable. It should be obvious that a culvert according to the invention is rather inexpensive as far as the material is concerned, and that the labor costs in building the culvert may be kept low. In addition, the culvert may be erected much quicker than conventional heavy-duty culverts, so that large overall savings are possible, compared with the conventional culverts.

Figure 4:
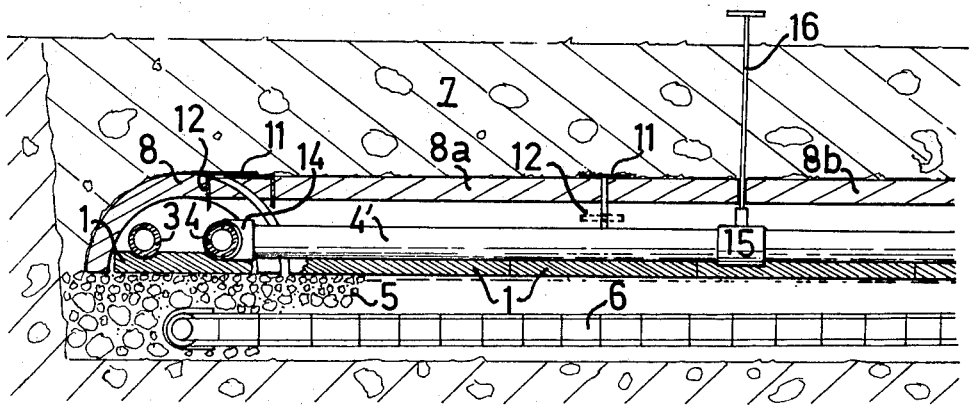
FIG. 4 is a cross-section of a culvert and a longitudinal section of a branch line connected to the main culvert.

FIG. 4 shows some additional features of the present culvert. The main culvert with cover member 8 is provided with a branch connection having cover members 8a and 8b extending at a 90° angle to the right in the figure. The cover member 8 is provided with a hole 13 in the right side, and the cross-section of the hole 13 essentially corresponds to the inner cross-section of the cover member 8a. The end of the cover member 8a is cut to conform to the shape of the side of the cover member 8, and the joint covered with a strip 11 of plastic sheet material. The base members 1 for the main and branch culvert are placed are placed on a gravel bed 5 at the bottom of the trench, and a drain pipe 6 is located in the gravel bed. The pipeline 4 is provided with a T-connection 14 to pipeline 4' of the branch culvert. A valve 15 may be located anywhere along any of the pipeline 5, and a valve stem 16 may enter the cover member and the filling 7 above the culvert. The stem 16 extends above the ground or terminates within a well in the usual manner. The place where the valve stem enters the cover member 8b may be sealed either by some suitable non-drying rubber-like composition or pushed through the material of the cover member so that the local compression of the material serves as a seal and prevents moisture from penetrating the culvert at this point. Similar simple and effective solutions may be applied to the present culvert which would have been quite impossible in a hermetically sealed heavy-duty culvert according to the prior art.

Throughout the specification it has been stated, that the material of the cover members 8, 8a, 8b and 8' respectively should be insulating and impervious to water. This may not be interpreted to mean that the cover as such has to be impervious to water, and it definitely does not have to be impervious to steam. Thus, the point where the valve stem passes through the cover has, in many cases, been difficult or impossible to seal. Also the culvert is quite unharmed if the cover is pierced. It is, for example, possible to penetrate the cover with the tip of a temperature sensor without causing any deleterious effect, despite the hole left in the cover when the sensor is removed. Practical tests have shown that the cover may actually be perforated and function essentially in the manner described. The reason for this is probably that any water entering the culvert from above will be diverted down the inner side surfaces of the cover and flow out through the more or less wide clearance between the edges of the base member and the inside of the cover. Incidentally, the base member may abut direct against the inner walls of the cover or there may be a clearance as shown in the drawings. It should be pointed out the "passage means" in a structure of this type is inherent in the construction in the absence of sealing means between the edges of the base member and the adjacent inner wall portion of the cover. The passage means includes it's base member of a material pervious to water and/or a perforated base member, non-sealed passages defined between the edges of the base member and adjacent inner wall portions of the cover. It should thus be realized that the main feature of the invention lies in the fact that the culvert is not sealed, but allows water vapor to escape and condense outside the culvert. Hence, the plastic sheet material strips 11 covering the joints between adjacent sections of the cover also serve as ventilation locations for water vapor and contribute to a more effective self-drying action of the culvert.

The teachings of the invention thus leads to very simple and efficient design concepts, which should be obvious to anyone skilled in the art in the light of the above description, and although the invention has been described with respect to preferred embodiments, it is to be understood that variations and modifications may be resorted to as will be apparent to those skilled in the art. Such variations and modifications are to be considered within the purview and scope of the claims appended hereto.

What I claim is:

1. A self-drying underground non-watertight culvert comprising, a base member of a heat insulating material pervious to water, an arcuate cover member over said base member to define therebetween a space, the arcuate cover member being of a heat insulating material having a higher insulation capacity than the base member, at least one heat radiating pipeline situated in said space between said base member and said cover member, and passage means between the base member and cover member providing communication between the space and the environment of said culvert to allow water, and/or vapor generated by the radiated heat acting on water in the culvert, to pass out into the environment by and through the base member.

2. A self-drying underground non-watertight culvert situated in a trench and comprising at least one layer of heat insulating material pervious to water placed over the bottom of the trench, at least one pipeline conveying heating fluid at elevated temperature situated above, and in thermal contact with said at least one layer constituting a base member for said at least one pipeline, and a plurality of serially arranged arcuate cover members forming a vault-shaped protective cover over said base member and said at least one pipeline, the cover members being of a heat insulating material having a higher insulation capacity than the one layer of heat insulating material constituting the base member, and passage means between the base member and cover providing communication between the interior of said base member and protective cover and the environment thereof to allow water, and water vapor generated by radiated heat from said at least one pipeline acting on water in said culvert, to pass out into the environment by and through said one layer of heat insulating material.

3. A method of providing an underground non-watertight culvert for at least one pipeline conveying a heating fluid at an elevated temperature, with said culvert having a substantially flat base member situated under a substantially vault-shaped cover member to enclose a space between the upper surface of said base member and the inner surface of said cover member, comprising the steps of digging a trench in the ground where the culvert is to be laid, placing at the bottom of said trench at least one layer of a heat insulating material pervious to water, placing on the upper surface of said at least one layer at least one substantially non-insulated pipeline of non-corroding material, and covering said at least one layer of insulating material and said at least one pipeline with vault-shaped, cover members of heat insulating material substantially impervious to water and having a higher insulation capacity than the said one layer of heat insulating material pervious to water, refilling said trench above and on the sides of said cover members, and feeding heating fluid at an elevated temperature through said at least one pipeline at a rate high enough to provide a drying of the interior of the culvert.

4. The method as claimed in claim 3 further comprising the step of providing drainage means under said at least one layer.

5. A method of providing an underground culvert for at least one pipeline conveying a heating fluid at an elevated temperature, with said culvert having a substantially flat base member situated under a substantially vault-shaped cover member to enclose a space between the upper surface of said base member and the inner surface of said cover member, comprising the steps of digging a trench in the ground where the culvert is to be laid, placing at the bottom of said trench at least one layer of a heat insulating material pervious to water, placing on the upper surface of said at least one layer at least one substantially non-insulated pipeline of non-corroding material, covering said at least one layer of insulating material and siad at least one pipeline with vault-shaped, heat insulating cover members substantially impervious to water, refilling said trench above and on the sides of said cover members, feeding heating fluid at an elevated temperature through said at least one pipeline at a rate high enough to provide a drying of the interior of the culvert, and selecting the thickness of insulating material in relation to the heat radiated from said at least one pipeline so as to generate around the outer surfaces of said culvert a comparatively dry region in which a comparatively steep temperature gradient prevails constituting a protective heat shield.

* * * * *